US008997121B2

(12) United States Patent
Trethewey et al.

(10) Patent No.: US 8,997,121 B2
(45) Date of Patent: Mar. 31, 2015

(54) PROVIDING SUPPORT FOR POSITION-RELATED APPLICATIONS

(75) Inventors: James R. Trethewey, Hillsboro, OR (US); Moulishankar Chandrasekaran, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 106 days.

(21) Appl. No.: 13/608,159

(22) Filed: Sep. 10, 2012

(65) Prior Publication Data

US 2014/0075457 A1 Mar. 13, 2014

(51) Int. Cl.
G06F 9/44 (2006.01)
G06F 7/00 (2006.01)
G01S 19/00 (2010.01)
G06F 13/10 (2006.01)

(52) U.S. Cl.
CPC .................................. *G06F 13/102* (2013.01)
USPC ........ 719/321; 342/357.2; 701/32.4; 701/400

(58) Field of Classification Search
USPC ................ 342/357.2; 701/32.4, 400; 719/321
See application file for complete search history.

(56) References Cited

U.S. PATENT DOCUMENTS

| 7,213,057 | B2 | 5/2007 | Trethewey et al. | |
| 2003/0109987 | A1* | 6/2003 | Barman et al. | 701/213 |
| 2005/0060377 | A1 | 3/2005 | Lo et al. | |
| 2005/0060575 | A1 | 3/2005 | Trethewey et al. | |
| 2005/0131715 | A1 | 6/2005 | Trethewey | |
| 2006/0074556 | A1* | 4/2006 | Hoiness et al. | 701/213 |
| 2007/0079030 | A1 | 4/2007 | Okuley et al. | |
| 2008/0152034 | A1 | 6/2008 | Liu et al. | |
| 2009/0271110 | A1* | 10/2009 | Sugiura | 701/208 |
| 2011/0072441 | A1* | 3/2011 | Parks et al. | 719/313 |
| 2011/0106474 | A1* | 5/2011 | Kulik et al. | 702/92 |
| 2012/0098700 | A1* | 4/2012 | Diggelen | 342/357.28 |
| 2012/0290266 | A1* | 11/2012 | Jain et al. | 702/187 |
| 2014/0143469 | A1* | 5/2014 | Tran et al. | 710/268 |

OTHER PUBLICATIONS

Trethewey, et al., "Providing Support for Display Articulation-Related Applications", U.S. Appl. No. 13/608,356, mailed on Sep. 10, 2012, 26 pages.
Trethewey, et al., "Providing Support for Device States", U.S. Appl. No. 13/608,683, mailed on Sep. 10, 2012, 30 pages.
Kumar, et al., "Cascading Power Consumption", U.S. Appl. No. 13/608,479, filed Sep. 10, 2012, 34 pages.

(Continued)

*Primary Examiner* — Charles E Anya
(74) *Attorney, Agent, or Firm* — International IP Law Group, P.L.L.C.

(57) ABSTRACT

A method of providing position support to a main processor of a computing device is disclosed. The method may include receiving primary position data from a sensor at a sensor controller. The method may also include analyzing, via the sensor controller, the primary position data to determine secondary position data. The method may also include formatting, via the sensor controller, the secondary position data. The method may also include aggregating, via the sensor controller, the formatted position data. The method may also include providing, via a single channel interface between the sensor controller and the main processor, the aggregated position data to an operating system installed on the main processor. The method may also include communicating, via a driver installed on the operating system, the position data to an application installed on the operating system.

27 Claims, 4 Drawing Sheets

(56) References Cited

OTHER PUBLICATIONS

Trethewey, et al., "Sensor and Context Based Adjustment of the Operation of a Network Controller", U.S. Appl. No. 13/608,419, field on Sep. 10, 2012, 31 pages.

Needham, et al., "Orientation Sensing Computing Devices", PCT Patent Application No. PCT/US2012/030488, filed on Mar. 25, 2012, 29 pages.

* cited by examiner

PROVIDING SUPPORT FOR POSITION-RELATED APPLICATIONS

TECHNICAL FIELD

This disclosure relates generally to providing support to an operating system for positioning related applications. More specifically, this disclosure relates to a sensor microcontroller configured to gather position-related contextual data from a sensor and provide the data to at least one driver installed on the operating system.

BACKGROUND ART

Some computer operating systems (OS) do not provide support for positioning sensors, except through a physical Serial COM Port Interface. For example, some versions of Microsoft Windows may allow applications such as Microsoft Streets &Trips and Google Earth to use the application programming interface (API) associated with the physical Serial COM Port Interface. The physical Serial COM Port Interface in turn is connected with a global positioning system (GPS) enabled device. However, additional position-related application programming interfaces (API's) may be available but may not be suited for use through the Serial COM Port Interface API.

The same numbers are used throughout the disclosure and the figures to reference like components and features. Numbers in the 100 series refer to features originally found in FIG. 1; numbers in the 200 series refer to features originally found in FIG. 2, and so on.

DESCRIPTION OF THE EMBODIMENTS

As discussed above, the present techniques relate generally to providing support to an operating system for position related applications. In some examples, a method for providing position data to position related applications is disclosed. The method may collect position data from one or more sensors configured to provide position data to a sensor controller. The method may also include analyzing and formatting the position data at the sensor controller. The analyzed and formatted position data may be then be provided to the operating system. The operating system may include one or more drivers to communicate the position data to the position related applications.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Further, a sensor controller may also be referred to herein as a sensor controller hub or a sensor hub being communicatively coupled to one or more sensors and a main processor of a computing device.

Figure 1:
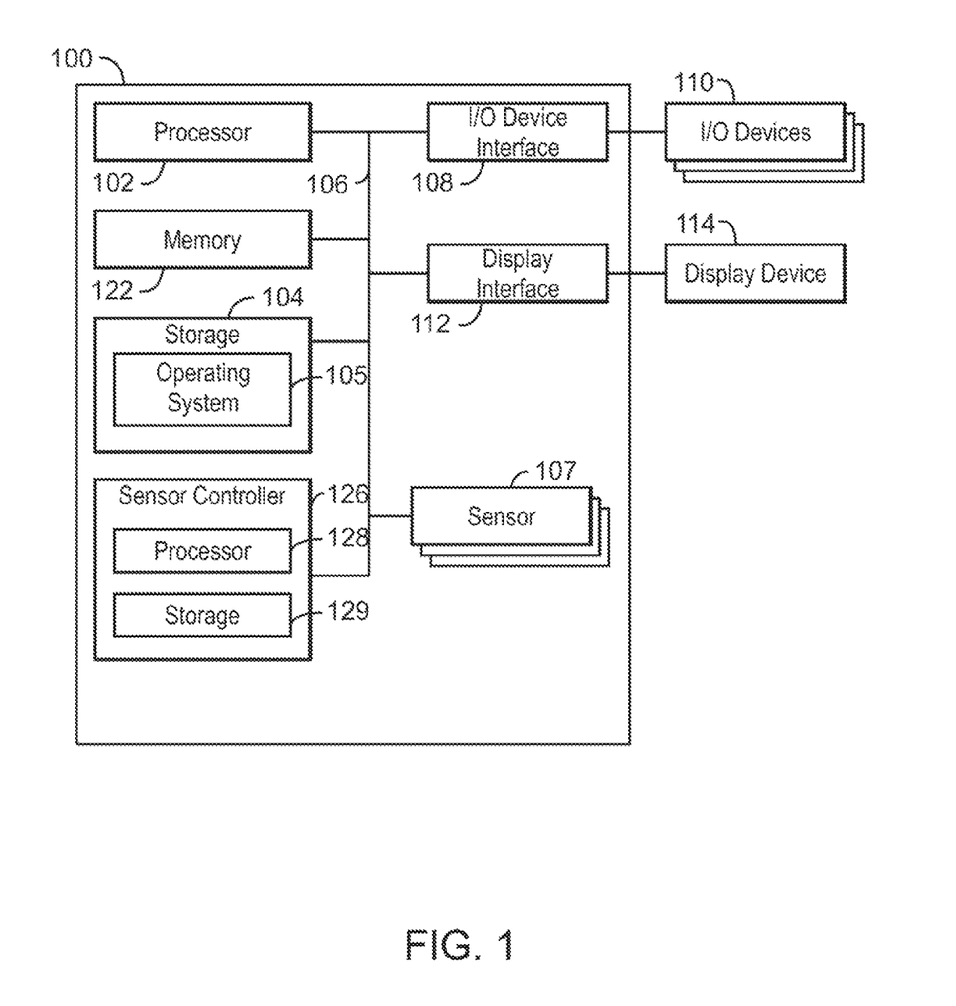
FIG. 1 is a block diagram of a computing device that may be used to provide support to an operating system for position related applications, in accordance with embodiments.

FIG. 1 is a block diagram of a computing device 100 that provides support to an operating system for position related applications, in accordance with embodiments. The computing device 100 may be, for example, a laptop computer, desktop computer, tablet computer, mobile device, server, or cellular phone, among others. The computing device 100 may include a processor 102 that is adapted to execute stored instructions, as well as a memory device 122 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 122 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 122 and that are executed by the processor 102 may be used to implement a method that includes providing support for position related applications.

The processor 102 may be connected through a system bus 106 (e.g., PCI, ISA, PCI-Express, HyperTransport®, NuBus, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may include a peripheral position device, such as a GPS device, that may be connected by means of a Serial COM port. The I/O devices 110 may be built-in components of the computing device 100, or may be devices that are externally connected to the computing device 100.

The processor 102 may also be linked through the system bus 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100.

The computing device 100 may also include a storage device 104. The storage device 104 may include a physical memory such as a hard drive, an optical drive, a flash drive, an array of drives, or any combinations thereof. The storage device 104 may also include remote storage drives. The storage device 104 may also include an operating system 105. The storage device 104 may store instructions thereon to provide position data to the operating system 105. In some embodiments, the operating system 105 may have installed thereon one or more drivers. The drivers enable a piece of hardware or an application installed on the operating system 105 to communicate with the operating system 105, applications, or other hardware of the computing device 100 including sensors 107. The drivers may also be used to enable a sensor controller 126 to communicate position data from the sensors 107 to the application installed on the operating system 105, in accordance with some embodiments. In some embodiments, the sensors 107 are connected to processor 102 via bus 106; however, in other embodiments, the sensors 107 are connected directly to processor 128 via a private bus (not shown), and communicatively coupled to processor 102 through processor 128 acting as intermediary. In some embodiments, the drivers are installed on the memory device 122. The memory device 122 may include instructions used to provide support to an operating system for position related applications in a similar manner as described in reference to the operating system 105 above.

The sensor controller 126 may include a processor 128. In some embodiments, the processor 128 is distinct from the main processor of the computing device such as the processor 102. The sensor controller 126 may also include an additional memory or storage device 129 with instructions thereon to provide position data to the operating system 105.

The processor 128 may execute stored instructions stored on either the memory device 122 and/or the storage device 104 and/or private memory or storage device 129 to provide position data to the operating system 105. The instructions may cause the processor 128 to receive primary position data from a sensor that collects position data, such as the one or more sensors 107. The instructions may cause the processor 128 to determine secondary position data based on the primary position data. The instructions may cause the processor 128 to format the primary position data and the secondary position data, and may aggregate the formatted position data. The instructions may cause the processor 128 to provide the aggregated position data, via a single data channel, to at least one driver on the operating system 105.

The processor 128 may format the position data by removing vendor-specific indicators from the primary position data. The vendor-specific indicators may be removed in any suitable way which may translate vendor-specific format to generic vendor independent format. For example, sensors 107 may gather position data formatted with vendor-specific registry sets to be used with specific drivers installed on the operating system 105. In order to enable the operating system 105 to interpret the data without having vendor-specific drivers installed on the operating system 105, the processor 128 of the sensor controller 126 may remove vendor-specific indicators, such as the vendor-specific registry sets from the position data received from the one or more sensors 107.

The processor 128 may also format the primary and secondary position data received from the one or more sensors 107 by packaging the position to enable the operating system 105 to detect individual sensor data in a single channel stream. Formatting the secondary position data to enable an operating system to detect individual sensors may include formatting the secondary position data according to human interface devices (HID) specifications promulgated by the Universal Serial Bus Implementer's Forum, thereby enabling some operating systems to incorporate common device drivers that could be reused between vendors. In particular, the HID specifications relating to sensors describe how individual sensors can be aggregated inside a single sensor collection abstraction, yet still providing a mechanism whereby it is possible for common device drivers to identify the individual sensors inside the sensor collection as well as the detailed characteristics of each sensor.

The processor 128 may analyze the primary position data to determine secondary position data. The primary position data may be gathered from one or more sensors 107, including an accelerometer, a magnetometer, a GPS radio sensor, a real-time clock sensor, a compass, and the like. In one example, analyzing the primary position data includes determining magnetic heading data by relating magnetic flux data to magnetic north data. In another example, analyzing the primary position data may include determining true heading data by relating magnetic declination data to the magnetic heading data. As another example, analyzing the primary position data may include determining magnetic declination data based on latitude and longitude readings. As another example, analyzing the primary position data may include determining a timestamp of the data. As yet another example, analyzing the primary position data may include determining clock drift of real-time clock data by relating real-time clock data to UTC data.

The processor 128 may also aggregate the position data. In some embodiments the processor 128 may aggregate the position data by combining the data into a single data channel or a data signal configured to be communicated via a single data channel. By aggregating the position data a single data channel, a single interface may be used such as the system bus 106, thereby simplifying possible hardware designs that may otherwise be implemented if each sensor 107 uses a separate interface. The aggregated position data may include one or more of: magnetic heading data; magnetic flux data; magnetic north data; magnetic declination data; true heading data; real-time clock data; coordinated universal time (UTC) data; latitude data; longitude data, or any combination thereof.

The processor 128 may provide the aggregated position data, via a single data channel, to at least one driver on the operating system 105. The driver enables the position data to be communicated with the application installed on the operating system 105. In some embodiments, the driver may be a virtual serial port driver configured to provide support to applications using a serial port driver API. The virtual serial port may be configured to enable older applications which may use a physical serial port on the computing device to connect to the operating system 105 and in turn, communicate with such applications. The applications that use a physical serial port may be referred to as "legacy applications." Thus, legacy applications may be configured to use a physical serial port to read position data from a peripheral position device, such as a GPS device. In these and other embodiments, the virtual serial port may then perform the function of enabling legacy applications to instead use the position data provided from the processor 128 of the sensor controller 126.

In embodiments, the driver is configured to communicate position data to an application, either a legacy application or a non-legacy application, installed on the operating system. In these and other embodiments, the legacy application may be an application that is configured to detect a serial port API as discussed above which, in turn, is configured to communicate to the virtual serial port driver. However, some legacy applications may also be configured to connect to a physical serial port of the computing device 100 in exclusive access mode. Exclusive access mode, in some operating systems such as Windows 7 for example, enable only one legacy application to communicate to the peripheral position device at any given time. Therefore, the driver may be a driver stack that includes the virtual serial port driver, the driver configured to communicate position data to a legacy application, and a position bridge driver to enable a position driver to communicate with a virtual serial port driver in a non-exclusive access mode.

The driver may also be a driver configured to communicate position data to a non-legacy application. The non-legacy applications may be configured to detect position data via API's in addition to the physical serial port API. For example, the non-legacy application may be configured to detect a location API, a sensor API, or both. In these and other embodiments, the sensor controller 126 may provide the position data to the driver, and the driver may be configured to communicate the position data to the non-legacy applications. By allowing the position data collected by the one or more sensors 107 to be provided by the sensor controller 126 to the operating system 105, non-legacy applications, in addition to legacy applications, may be enabled to receive position data without the connecting to a peripheral position device.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
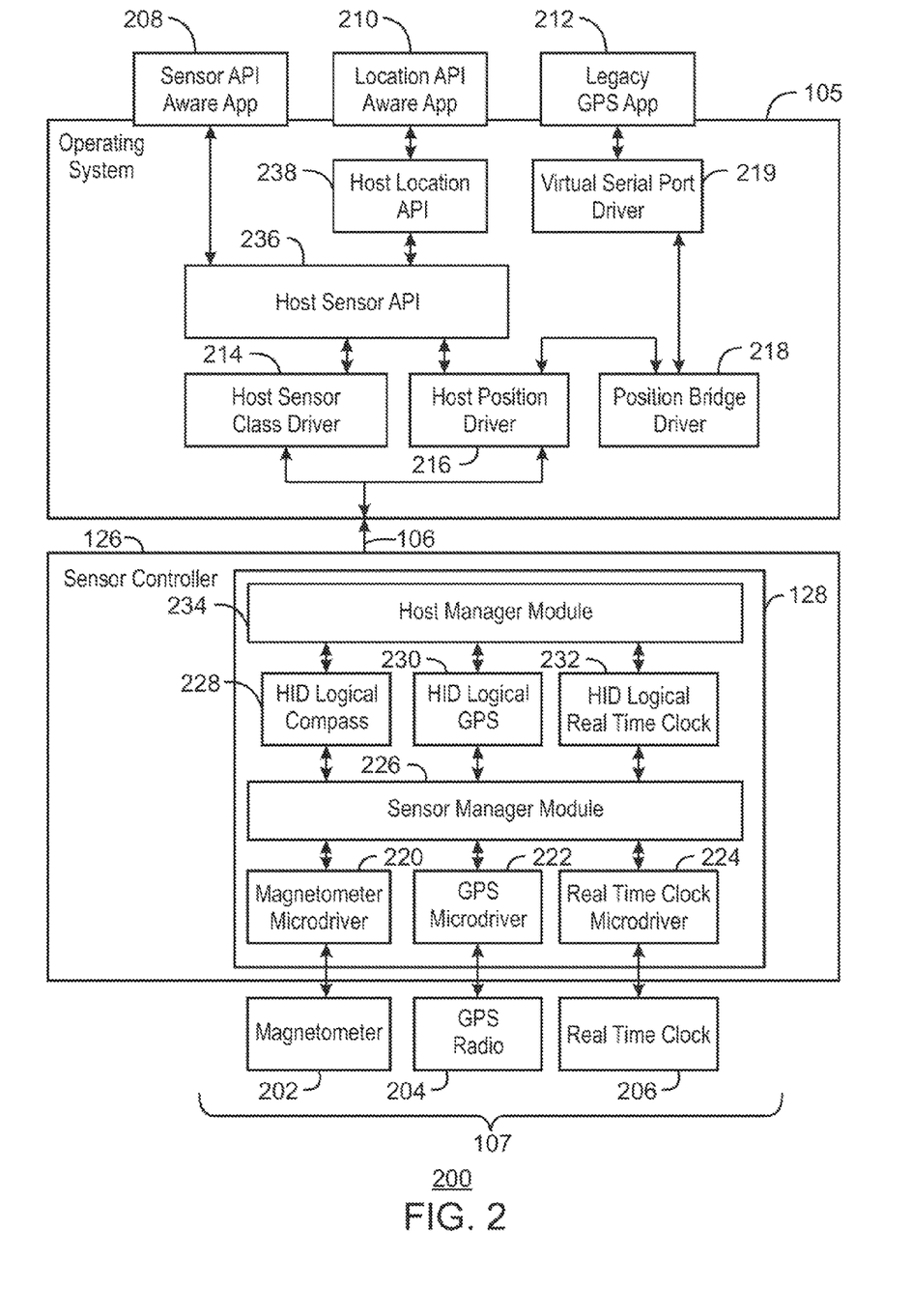
FIG. 2 is a system for providing support to an operating system for position related applications, in accordance with embodiments.

In some embodiments, the functions performed as a result of instructions carried out by processor 128 may be coordinated by a system. FIG. 2 describes a system 200 including the sensor controller 126 and the operating system 105, which may be included in the computing device 100 of FIG. 1. In addition, the system 200 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile Internet device (MID), messaging device, data communication device, or the like.

As shown in FIG. 2, the sensor controller 126 may be communicatively coupled to the operating system 105, and may include the processor 128. The instructions involved in providing position support to the operating system 105 may be carried about by the processor 128 rather than a main processor, such as the processor 102 of the computing device 100. By including the processor 128, power may be saved in processing the task of providing position data to applications on the operating system 105.

FIG. 2 depicts one or more sensors 202, 204, 206 that may be included in the one or more sensors 107. Specifically, the one or more sensors 107 may include a magnetometer sensor 202, a GPS radio sensor 204, a Real-time Clock sensor 206, among other sensors that may be useful to position-related applications installed on the operating system 105. The sensors 202, 204, 206 may be communicatively coupled to the sensor controller 126 by an interface including, but not limited to, an I2C bus, a USB cable, and the like. The sensor controller 126 may also be communicatively coupled to the operating system 105, by the interface 106. Additionally or alternatively, the interface 106 may include, but is not limited to, an I2C wire, a USB cable, and the like. The sensor controller 126 may provide position data from the sensors to an application, including one or more of the applications 208, 210, 212, installed on the operating system 105. The system 200 may also include one or more drivers 214, 216, 218 to enable the sensor controller 126 to communicate position data to the application installed on the operating system 105.

In operation, the position data may include primary position data and secondary position data. The primary position data may include GPS data, orientation data, heading data, acceleration data, and the like. The sensor controller 126 of the system 200 may receive primary position data from a sensor, such as one of the sensors 202, 204, 206. The sensor controller 126 may include the processor 128. The processor 128 may include various software modules configured to carry out functions to provide the position data support.

In one embodiment, system 200 may include one or more microdrivers 220, 222, 224 of the processor 128. The one or more microdrivers 220, 222, 224 may format the primary position data received from the sensors 202, 204, 206, by removing any vendor-specific indicators. Each of the one or more microdrivers 220, 222, 224 may be individually coupled with an associated type of sensor to which each is connected. For example, a magnetometer microdriver 220 may be coupled to the magnetometer sensor 202, a GPS microdriver 222 may be coupled to the GPS radio sensor 204, and a real-time clock microdriver 224 may be coupled to a real-time clock sensor 206. As discussed, each of the one or more microdrivers 220, 222, 224 may format primary position data by removing vendor specific indicators including, but not limited to, vendor registry sets.

The system 200 may also include a sensor manager module 226 of the processor 128. The sensor manager module 226 may analyze the primary position data gathered by the one or more sensors 202, 204, 206. The sensor manager module 226 may determine secondary position data based on the primary position data received from one or more of the sensors 202, 204, 206, and formatted by the one or more microdrivers 220, 222, 224.

As previously discussed in reference to FIG. 1, the processor 128 may case the sensor controller 126 to analyze the primary position data to determine secondary position data. The secondary position data may include: timestamping of the primary position data, true north headings calculated and/or determined from primary position data, magnetic north headings calculated and/or determined from primary position data, and the like.

The system 200 may also include one or more HID logical devices 228, 230, 232 of the sensor controller 126. The one or more HID logical devices 228, 230, 232 may be configured to format the primary position data and the secondary position data determined by the sensor manager module 226. As previously discussed in reference to FIG. 1, the sensor controller 126 may format the primary and secondary position data received from the one or more sensors 202, 204, 206 by packaging the position data to enable the operating system 105 to detect individual sensor data in a single channel stream. The one or more HID logical devices 228, 230, 232 enable the sensor controller 126 to format the secondary position data to enable the operating system 105 to detect individual sensors according to HID specifications. However, not all operating systems incorporate common device drivers for all types and kinds of position data and additional drivers may be used.

The system 200 may also include a host manager module 234 of the sensor controller 126. The host manager module 234 may be configured to aggregate the formatted position data and provide the aggregated position data to the operating system 105. In these and other embodiments, the host manager module aggregates the formatted HID and non-vendor specific position data, including both primary and secondary position data, to enable the sensor controller 126 to provide the formatted position data to the operating system 105 via a single channel interface 106. By providing the formatted position data to the operating system 105 via a single channel, individual communication interfaces from each of the one or more sensors 202, 204, 206 can be eliminated, enabling a relatively simple interface between one or more sensors 202, 204, 206 and the operating system 105.

Once the position data is received by the operating system 105, the position data may be interpreted by the operating system 105 via, one or more drivers 214, 216, 218, 219. As discussed above with reference to FIG. 1, the one or more drivers 214, 216, 218, 214 enable the position data to be communicated with an application, such as the one or more applications 208, 210, 212 installed on the operating system 105.

While some operating systems may include a generic driver such as the Host Sensor Class Driver 214, some generic class drivers do not provide support for position data. Therefore, a host position driver 216 is provided as well as position bridge driver 218 and virtual serial port driver 219. In general the drivers 214, 216, 218, 219 each provide some level of support to applications 208, 210, 212. The host position driver 216 provides driver support for applications when host sensor class driver 214 does not provide such support. Specifically, host position driver 216 provides support for a sensor-API-aware application 208 and a location-API-aware application 210 when the host sensor class driver 214 does not. For example, Microsoft Windows 7 and 8 support position devices only through physical serial COM port interfaces and use the API associated with physical interface, even though a location API has been available since at least Windows 7 was released.

In addition to providing support via host position driver 216, the system 200 also enables position data provided by the sensor controller 126 to be provided to legacy GPS application 212 through a virtual serial port driver 219 as opposed to a physical serial port driver (not shown). The virtual serial port driver 219 allows the legacy GPS application 212 to communicatively receive position data from the sensor controller 126 via the host position driver 216 and the position bridge driver 218. The position bridge driver 218 allows communicative coupling between the host position driver 216 and the virtual serial port driver 219 while allowing the legacy GPS application 212 to simultaneously access virtual serial port driver 219. The simultaneous access is useful because many legacy GPS applications 212 only attach to a driver such as the virtual serial port driver 219 in "exclusive access" mode. However, by including the position bridge driver 218, both the host position driver 216 and the legacy GPS application 212 may use the virtual serial port driver 219 at the same time.

Both driver 214 and 216 are communicatively coupled to the host sensor application programming interface (API) 236, which in turn is communicatively coupled to sensor-API-aware application 208 and location-API-aware application 210. In some embodiments, the operating system 105 may include a host location API 238 configured to communicate position data from the host sensor API 236 to the location-API-aware application 210.

The embodiments discussed above with reference to FIG. 1 and/or FIG. 2 may be implemented as a method which may be carried out by a computing device, such as the computing device 100 and/or the system 200.

Figure 3:
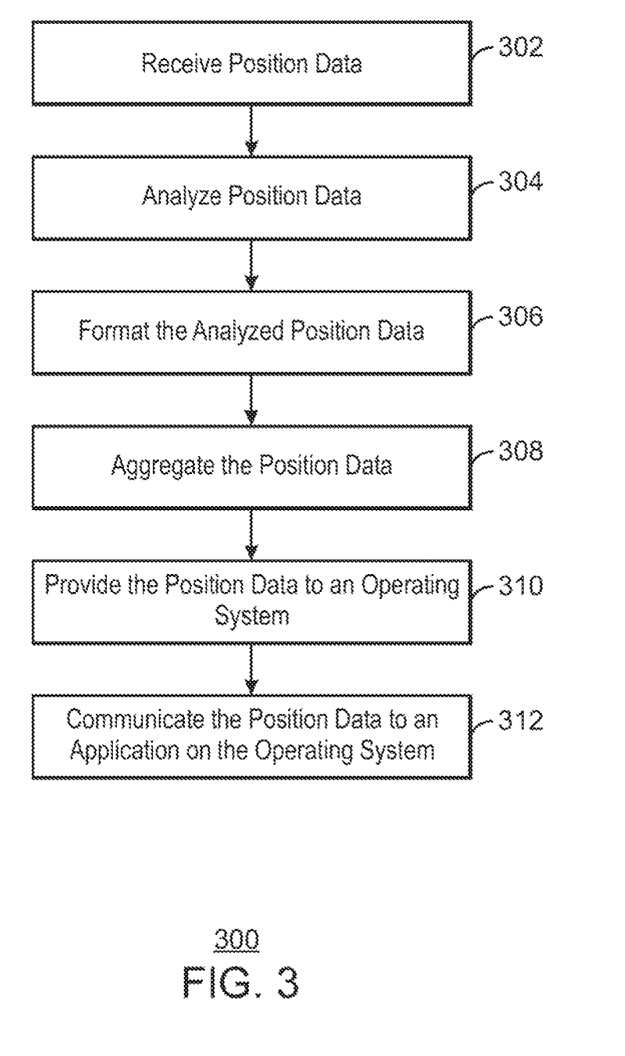
FIG. 3 is a process flow diagram showing a method for providing support to an operating system for position related applications, in accordance with embodiments.

FIG. 3 is a process flow diagram showing a method 300 for providing position support to a main processor of a computing device, in accordance with embodiments.

At block 302, position data is received from a sensor at a sensor controller. The position data received from the sensor may be primary position data, wherein the term primary may indicate position data which has not been analyzed. In one example, receiving primary position data from a sensor (block 302) may include receiving magnetic declination reports from satellites.

The process flow continues at block 304, where the primary position data is analyzed, via the sensor controller to determine secondary position data. In some embodiments, secondary position data may include data determined by analyzing primary position data.

At block 306, the secondary position data may be formatted. In some embodiments, formatting the secondary position data (block 306) may include removing vendor-specific indicators. Formatting the secondary position data may also include formatting the secondary position data to enable to operating system to detect individual sensors may include formatting according to HID specifications, thus enabling an operating system to incorporate common device drivers.

At block 308, the formatted position data may be aggregated via the sensor controller. Some operating systems may communicate with sensors via many different interfaces in order to detect signals coming from individual sensors. By formatting the secondary position data (block 306) to enable the operating system to detect individual sensors, the secondary position data may be aggregated (block 308) and provided to a main processor running an operating system via a single channel. Thus, at block 310, the aggregated position data is provided to an operating system installed on the main processor via a single channel.

At block 312, the position data may be communicated to an application installed on the operating system via one or more drivers installed on the operating system. Although some operating systems may include common device drivers as discussed in regard to block 306 above, some operating systems may not provide common device drivers. Additionally, some common device drivers may not include support for specific type of position data as well as specific types of position-related applications which may be able to use the position data. Therefore, at block 312, the position data is communicated to the application via the driver installed on the operating system.

As described above, examples of a computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a computing device may also include a computer that is arranged to be worn or grasped by a person, such as a wrist computer, finger computer, ring, computer, eyeglass computer, belt-clip computer, arm-band computer, shoe computer, clothing computer, pen computer, puck computer, or any other suitable type of wearable or graspable computer. For example, the computing device may be implemented as a smart phone capable of executing computer applications, as well as voice communications and/or data communications. Although some embodiments may be described with a computing device implemented as a smart phone by way of example, it may be appreciated that other embodiments may be implemented using other mobile computing devices as well. The computing device may also include a graphics processing unit (CPU) that is configured to execute stored instructions and a storage device that stores instructions.

Figure 4:
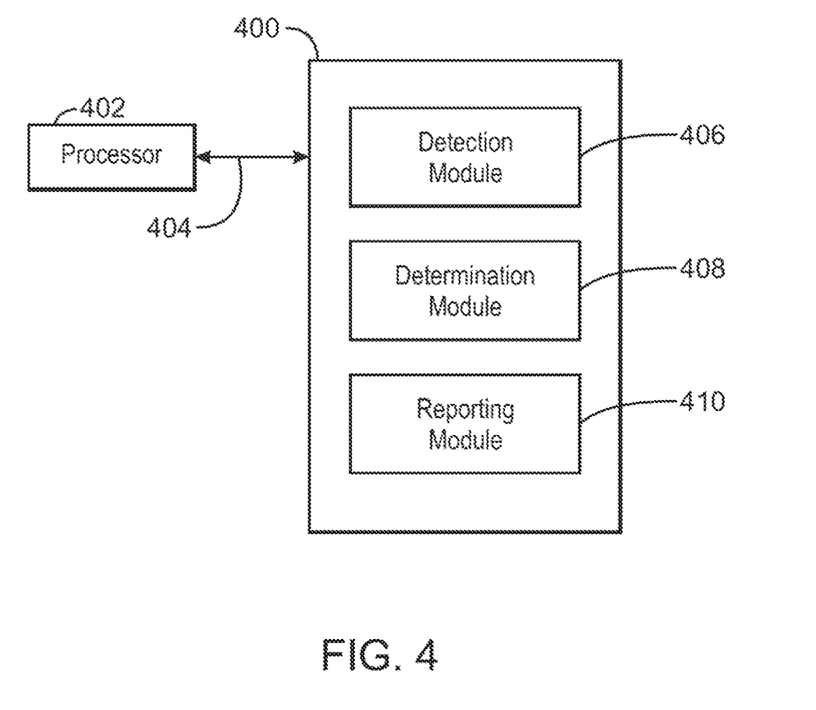
FIG. 4 is a block diagram showing a tangible, non-transitory computer readable medium that stores code for providing position support to applications of a computing device in accordance with embodiments.

FIG. 4 is a is a block diagram showing a tangible, non-transitory computer-readable medium 400 that stores code for providing position support to applications of a computing device in accordance with embodiments. The tangible, non-transitory computer-readable medium 400 may be accessed by a processor 402 over a computer bus 404. Furthermore, the tangible, non-transitory, computer-readable medium 400 may include code configured to direct the processor 402 to perform the methods described herein.

The various software components discussed herein may be stored on the tangible, non-transitory computer-readable medium 400, as indicated in FIG. 4. For example, a detection module 406 may be configured to receive primary position data from one or more sensors communicatively coupled to the non-transitory computer-readable medium 400.

The non-transitory computer-readable medium 400 may also include a determination module 408 configured to determine secondary position data based on the primary position data. The determination module 408 may also be configured to format the primary position data and the secondary position data provided to an operating system. In some embodiments, the formatting may include removing vendor-specific indicators, such as vendor registry sets, from the primary position data. The formatting may also include packaging the primary and secondary position data to enable an operating system to detect individual sensors.

The non-transitory computer-readable medium 400 may also include a reporting module 410. The reporting module 410 may aggregate the formatted position data to be communicated with the operating system via a single data channel. The reporting module 410 may also be configured to provide the aggregated position data, via the single data channel, to at least lone driver on the operating system.

EXAMPLE 1

A computing device is described herein. The computing device may include a processor. The computing device may also include a computer-readable medium that stores instructions position that, when executed by the processor, direct the processor to receive primary position data from a sensor that collects position data. The instructions may also direct the processor to determine secondary position data based on the primary position data. The instructions may also direct the processor to format the primary position data and the secondary position data. The instructions may also direct the processor to aggregate the formatted position data. The instructions may also direct the processor to provide the aggregated position data, via a single data channel, to at least one driver on the operating system.

The aggregation may be performed after or concurrently with the formatting of the position data. The method may format and aggregate both primary position data and secondary position data. The position data may be gathered from one or more sensors at the computing device. The computing device may be a sensor controller communicatively coupled to a main processor of a main computing device having an operating system installed thereon. The sensor controller may serve as a hub communicatively coupling the sensors to the main processor (the main computing device having an operating system installed thereon.

EXAMPLE 2

A method is described herein. The method may include receiving prima position data from a sensor at a sensor controller. The method may also include analyzing, via the sensor controller, the primary position data to determine secondary position data. The method may also include formatting, via the sensor controller, the secondary position data. The method may also include aggregating, via the sensor controller, the formatted position data. The method may also include providing, via a single channel interface between the sensor controller and the main processor, the aggregated position data to an operating system installed on the main processor. The method may also include communicating, via a driver installed on the operating system, the position data to an application installed on the operating system.

The aggregation may be performed after or concurrently with the formatting of the position data. The method may format and aggregate both primary position data and secondary position data. The position data may be gathered from one or more sensors at the sensor controller. The sensor controller may serve as a hub communicatively coupling the sensors to the main processor of a computing device having an operating system installed thereon.

EXAMPLE 3

At least one computer-readable medium is described herein. The computer-readable medium may have instructions stored therein that, in response to being executed on a computing device, cause the computing device to receive primary position data from a sensor communicatively coupled to the computer readable medium. The instructions may also cause the computing device to determine secondary position data based on the primary position data. The instructions may also cause the computing device to format the primary and secondary position data to be provided to an operating system. The instructions may also cause the computing device to aggregate the formatted position data. The instructions may also cause the computing device to provide, via a single channel, the aggregated position data to a driver installed on the operating system.

The at least one computer-readable medium may carry out the instructions in a different order. For example, the position data may be received concurrently or after secondary position data has been determined for position data previously received. The formatting may also be done before the aggregation. The at least one computer-readable medium may also be referred to as the sensor controller. The at least one computer-readable medium may provide support to a position-related application installed on the operating system.

EXAMPLE 4

A system is described herein. The system may include a sensor controller communicatively coupled to a sensor to gather position data. The system may also include and a main processor having an operating system installed thereon, the sensor controller to provide the position data from the sensors to an application installed on the operating system. The system may also include a driver installed on the operating system to enable the sensor controller to communicate the position data to the application installed on the operating system.

The system may include more than one sensor. The position data may be analyzed and formatted by the sensor controller before being provided to the main processor having the operating system installed thereon. The system may include more than one application installed on the operating system. The system may also communicate the position data to more than one application via the operating system and the driver installed on the main processor.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system, comprising:
a sensor controller communicatively coupled to sensors to gather position data and a main processor having an operating system installed thereon, the sensor controller to provide the position data from the sensors to an application installed on the operating system; and
a driver installed on the operating system to enable the sensor controller to communicate the position data to the application installed on the operating system;
wherein position data comprises primary position data and secondary position data, and wherein the sensor controller is to:
receive primary position data from at least one of the sensors;
determine secondary position data based on the primary position data;
format the primary and secondary position data to be provided to the operating system by removing vendor-specific indicators from the primary position data and packaging the secondary position data to enable the operating system to detect individual sensors;
aggregate the formatted position data; and
provide the aggregated position data to the operating system via a single data channel.

2. The system of claim 1, wherein the sensor controller determines the secondary position data by determining magnetic heading data by relating magnetic flux data to magnetic north data.

3. The system of claim 1, wherein the sensor controller determines the secondary position data by determining true heading data by relating magnetic declination data to the magnetic heading data.

4. The system of claim 1, wherein the sensor controller determines the secondary position data by determining magnetic declination data based on latitude and longitude readings.

5. The system of claim 1, wherein the sensor controller determines the secondary position data by determining a timestamp of the data.

6. The system of claim 1, wherein the sensor controller determines the secondary position data by determining clock drift of real-time clock data by relating real-time clock data to UTC data.

7. The system of claim 1, wherein the sensor controller is a sensor controller hub having sensors communicatively coupled to the sensor controller hub, and the sensor controller hub being communicatively coupled to the main processor.

8. A computing device, comprising:
a processor; and
a computer-readable medium that stores instructions position that, when executed by the processor, direct the processor to:
receive primary position data from a sensor that collects position data;
determine secondary position data based on the primary position data;
format the primary position data and the secondary position data by removing vendor-specific indicators from the primary position data and packaging the primary and secondary position data to enable an operating system to detect the sensor;
aggregate the formatted position data; and
provide the aggregated position data, via a single data channel, to at least one driver on the operating system.

9. The computing device of claim 8, wherein the processor determines the secondary position data by determining magnetic heading data by relating magnetic flux data to magnetic north data.

10. The computing device of claim 8, wherein the processor determines the secondary position data by determining true heading data by relating magnetic declination data to the magnetic heading data.

11. The computing device of claim 8, wherein the processor determines the secondary position data by determining magnetic declination data based on latitude and longitude readings.

12. The computing device of claim 8, the processor determines the secondary position data by determining a timestamp of the data.

13. The computing device of claim 8, wherein the sensor controller determines the secondary position data by determining clock drift of real-time clock data by relating real-time clock data to UTC data.

14. The computing device of claim 8, wherein the aggregated position data comprises one or more of:
   magnetic heading data;
   magnetic flux data;
   magnetic north data;
   magnetic declination data;
   true heading data;
   real-time clock data;
   coordinated universal time (UTC) data;
   latitude data; and
   longitude data.

15. The computing device of claim 8, wherein the driver is a position driver to format the position data into one or more formats comprising:
   a format compliant with a sensor application programming interface (API) of the operating system; and
   a format compliant with an API associated with a physical port.

16. The computing device of claim 8, wherein the driver is a virtual serial port driver to provide support to applications using a serial port driver API.

17. The computing device of claim 8, wherein the driver is a position bridge driver to enable a position driver to communicate with a virtual serial port driver in a non-exclusive access mode.

18. The computing device of claim 8, wherein the driver is to communicate the position data to an application installed on the operating system, and wherein the application installed on an operating system is one or more of:
   an application that is to detect a location API;
   an application that is to detect a sensor API; and
   an application that is to detect a serial port API.

19. A method comprising:
   receiving primary position data from a sensor at a sensor controller;
   analyzing, via the sensor controller, the primary position data to determine secondary position data;
   formatting, via the sensor controller, the secondary position data, wherein formatting the secondary position data comprises removing vendor-specific indicators and packaging the secondary position data to enable an operating system to detect the sensor;
   aggregating, via the sensor controller, the formatted position data;
   providing, via a single channel interface between the sensor controller and the main processor, the aggregated position data to the operating system installed on the main processor; and
   communicating, via a driver installed on the operating system, the position data to an application installed on the operating system.

20. At least one non-transitory computer-readable medium having instructions stored therein that, in response to being executed on a computing device, cause the computing device to:
   receive primary position data from a sensor communicatively coupled to the computer readable medium;
   determine secondary position data based on the primary position data;
   format the primary and secondary position data to be provided to an operating system by removing vendor-specific indicators from the primary position data and packaging the primary and secondary position data to enable the operating system to detect the sensor;
   aggregate the formatted position data; and
   provide, via a single channel, the aggregated position data to a driver installed on the operating system.

21. The at least one non-transitory computer-readable medium of claim 20, wherein determining secondary position data comprises determining magnetic heading data by relating magnetic flux data to magnetic north data.

22. The at least one non-transitory computer-readable medium of claim 20, wherein determining secondary position data comprises determining true heading data by relating magnetic declination data to the magnetic heading data.

23. The at least one non-transitory computer-readable medium of claim 20, wherein determining secondary position data comprises determining magnetic declination data based on latitude and longitude readings.

24. The at least one non-transitory computer-readable medium of claim 20, wherein determining secondary position data comprises determining a timestamp of the position data.

25. The at least one non-transitory computer-readable medium of claim 20, wherein determining secondary position data comprises determining clock drift of real-time clock data by relating real-time clock data to UTC data.

26. The at least one non-transitory computer-readable medium of claim 20, wherein the driver is one or more of:
   a position driver to format the position data into one or more formats comprising:
   a format compliant with a sensor application programming interface (API) of the operating system; and
   a format compliant with an API associated with a physical port;
   a virtual serial port driver to provide support to applications using a serial port driver API;
   a position bridge driver to enable the position driver to communicate with the virtual serial port driver in a non-exclusive access mode.

27. The at least one non-transitory computer-readable medium of claim 20, wherein the driver is to communicate the position data to an application installed on the operating system, and wherein the application installed on an operating system is one or more of:
   an application that is to detect a location API;
   an application that is to detect a sensor API; and
   an application that is to detect a serial port API.

* * * * *